(No Model.) 2 Sheets—Sheet 1.
G. M. HILL & F. P. ALTER.
CHANGE MAKER AND RECEIVER.
No. 488,007. Patented Dec. 13, 1892.
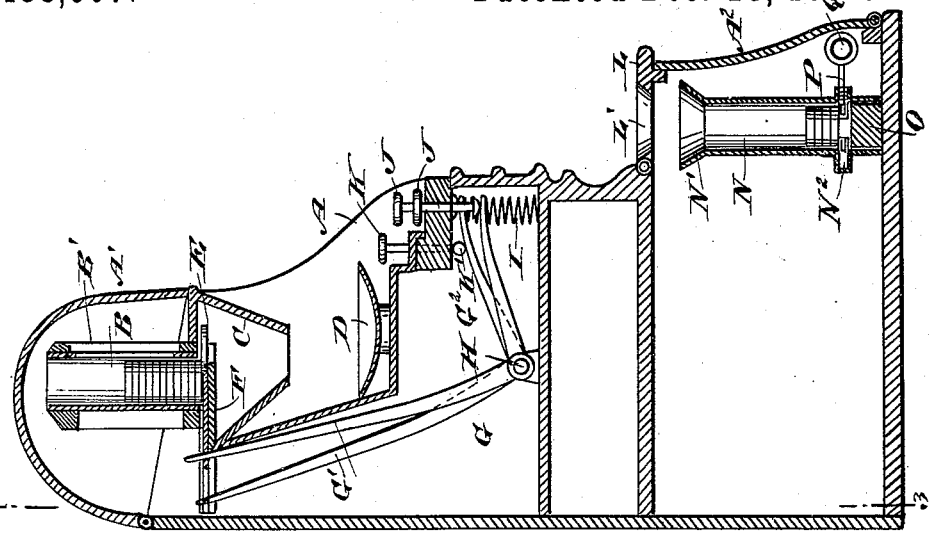
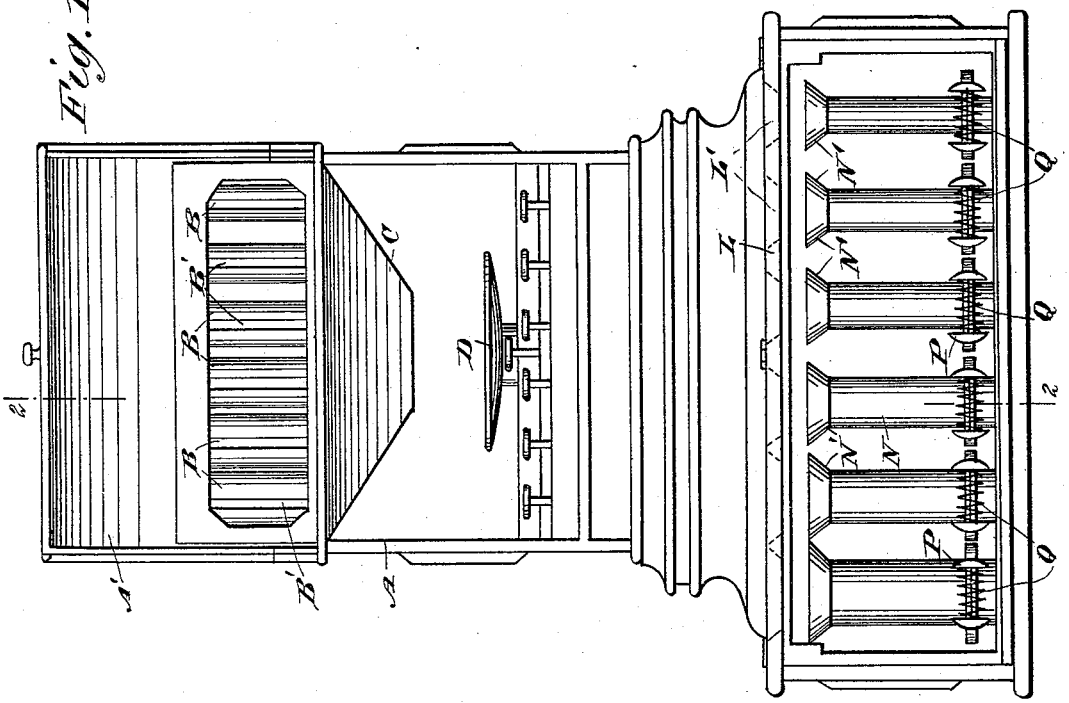
WITNESSES:
C. Neveux
C. Sedgwick
INVENTORS:
G. M. Hill
F. P. Alter
BY Munn & Co.
ATTORNEYS.
THE NORRIS PETERS CO., PHOTO-LITHO., WASHINGTON, D. C.

(No Model.) 2 Sheets—Sheet 2.
G. M. HILL & F. P. ALTER.
CHANGE MAKER AND RECEIVER.
No. 488,007. Patented Dec. 13, 1892.
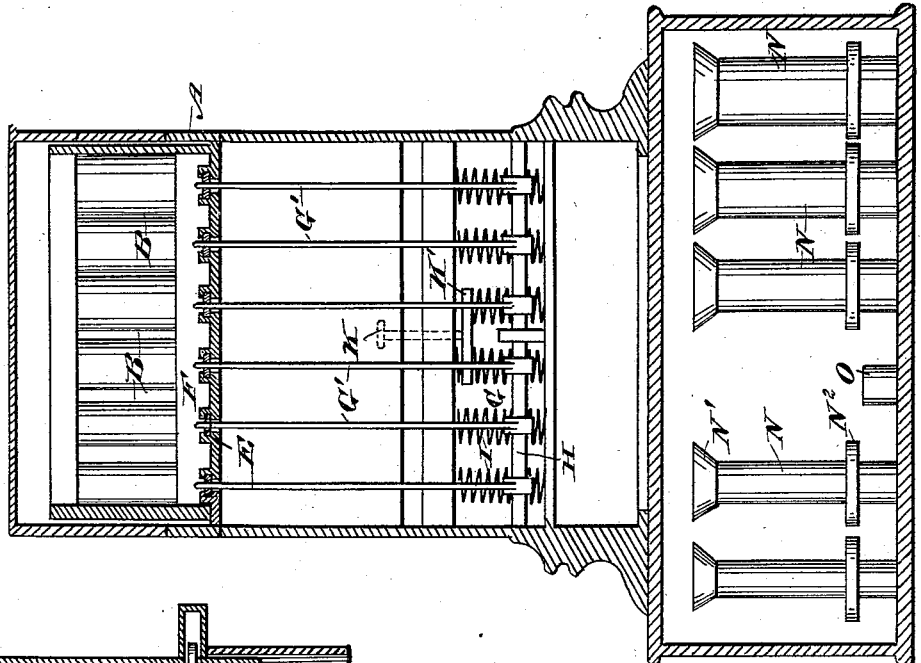
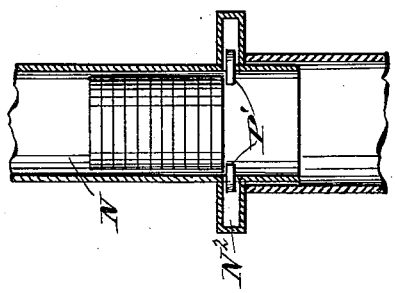
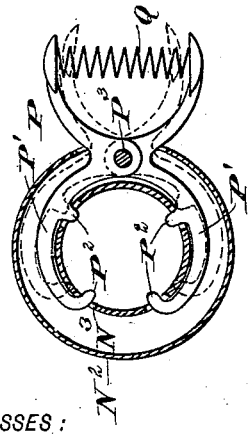
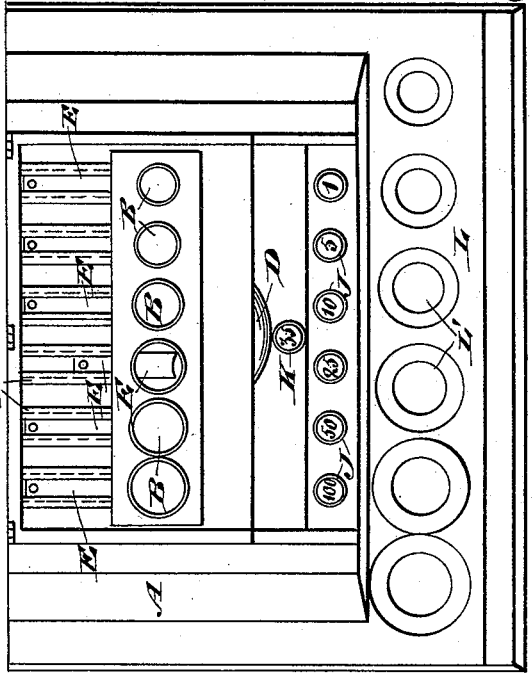
WITNESSES:
C. Neveux
C. Sedgwick
INVENTORS:
G. M. Hill
F. P. Alter
BY Munn & Co
ATTORNEYS.

UNITED STATES PATENT OFFICE.

GEORGE M. HILL AND FRED P. ALTER, OF CENTRALIA, WISCONSIN.

CHANGE MAKER AND RECEIVER.

SPECIFICATION forming part of Letters Patent No. 488,007, dated December 13, 1892.

Application filed May 18, 1892. Serial No. 433,477. (No model.)

*To all whom it may concern:*

Be it known that we, GEORGE M. HILL and FRED P. ALTER, both of Centralia, in the county of Wood and State of Wisconsin, have invented a new and Improved Change-Maker, of which the following is a full, clear, and exact description.

The object of the invention is to provide a new and improved change-maker which is simple and durable in construction and arranged to quickly and conveniently make any desired amount of coin change.

The invention consists principally of a series of tubes adapted to receive the various denominations of coins, a general delivery-chute into which opens the series of tubes, push-bars or slides for moving one coin at a time from a tube into the delivery-chute, and keys for manipulating the said push-bars individually or collectively.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a front elevation of the improvement with the cover swung back. Fig. 2 is a transverse section of the same on the line 2 2 of Fig. 1. Fig. 3 is a rear sectional elevation of the same on the line 3 3 of Fig. 2. Fig. 4 is a plan view of the improvement with the cover removed. Fig. 5 is an enlarged sectional plan view of one of the coin-receiving tubes, and Fig. 6 is a sectional side elevation of the same.

The improved change-maker is provided with a suitably-constructed casing A, provided at its upper end with a cover A', adapted to close over a series of tubes B, arranged alongside each other and adapted to receive the various denominations of coins, the first or largest tube being intended to receive dollars, the next fifty-cent pieces, the next twenty-five-cent pieces, the following one ten-cent pieces, the next one nickels, and the other pennies.

Each of the tubes B is formed in its front with a slot B' for conveniently viewing the contents of the receiving-tube when the cover A' is swung back, so as to enable the operator to see whether one of the tubes needs refilling or not. The several tubes B open at their lower ends into a chute C, having inclined sides and ends and leading to a change-table D, set in the casing A, and on which the several coins making the desired amount of change pass from the tubes to the chute C.

The lowermost coin in each of the tubes B is adapted to be removed from the tube through a slot in the front end of the tube, the said slot opening into the general chute C, as will be readily understood by reference to Fig. 2. In order to remove the lowermost coin, a push-bar or slide E is fitted to slide in suitable guideways F, arranged in the casing A and extending rearward from the tubes B. Each of the slides E is engaged at its rear end by the upwardly-extending arm G' of a bell-crank lever G, fulcrumed on a longitudinally-extending rod H, held in the casing A. The other arm $G^2$ of each bell-crank lever G extends forward and its under side is pressed on at its free end by a spring I, set in the casing A, so that the bell-crank lever is held in a normal position—that is, the upwardly-extending arm G' holds the push-bar E in a rearmost position or out of engagement with the respective bottom coin in the corresponding tube B. The free end of each arm $G^2$ of each bell-crank lever G is adapted to be pressed by a key J, fitted to slide in the casing A at the front of the same, the upper or outer ends of the keys being marked with a numeral indicating the corresponding coin contained in the respective tube B. Thus the key J, manipulating the bell-crank lever G, connected with the slide for the largest tube B, is marked "One dollar," the next key to it is marked "Fifty cents," and so on. Now it will be seen that when the operator presses on the key J marked "Fifty cents," then the bell-crank lever G, connected with the said key, is actuated, so that the slide connected with the bell-crank lever is pushed forward and moves the fifty-cent piece out of the lower end of the tube B into the chute C, from which it falls upon the change-table D. If the operator presses a key J marked "Ten cents," then the ten-cent piece will be passed from the corresponding ten-cent tube B upon the change-table. Thus if it be desired to make, say, eighty-five cents change, the operator presses successively or simultaneously on the three keys marked "Fifty cents," "Twenty-five cents," and "Ten cents," whereby the three coins aggregating eighty-five cents drop upon the change-table D.

In order to actuate several bell-crank levers G at the same time from a single key, we provide an additional set of keys K, each of which is provided at its lower end with a bar K', adapted to extend over the desired arms $G^2$ of such bell-crank levers G as make collectively a desired amount of change. For instance, as shown in Fig. 4, the key K is marked "thirty-five cents"—that is, when pressed its arm K' actuates the two arms $G^2$ of the bell-crank levers G, connected with the tubes B, containing twenty-five-cent and ten-cent pieces. In a like manner a key K, having its bar K' connecting these arms $G^2$, may be arranged so as to actuate several bell-crank levers at a time for a certain amount.

In order to fill the tubes B with the proper coins, the following device is provided: On the front of the casing A is arranged a horizontally-extending hinged cover or lid L, formed with a series of openings L', varying in size and opening into filling-tubes N, set with their lower ends on lugs O, attached to the bottom of the casing A. (See Figs. 2 and 3.) Each of these tubes N is formed at its upper end with an upwardly an outwardly extending flaring flange N', and near the lower end of each tube is arranged a circular hollow offset $N^2$, containing a pair of tongs P, the two members P' of which are formed with lugs $P^2$, extending through the sides of the tube N into the latter, so as to support a coin dropped into the upper end of the tube through one of the openings L' in the lid L. The two members P' are fulcrumed at $P^3$ in the circular offset $N^2$ and the outer or handle ends of the pair of tongs are pressed apart by the spring Q, as will be readily understood by reference to Fig. 5.

Access is had to the filling-tubes N through a door $A^2$, formed in the front lower part of the casing A. The several filling-tubes N are of various sizes, according to the amount of the coins to be received, the said tubes corresponding in size to the tubes B and being arranged in a like manner. Now if money is received the coins, according to their denomination, are placed in the corresponding opening L', so as to drop into the corresponding filling-tube N, the first coin dropped into the latter resting on the lugs $P^2$ of the pair of tongs P. When one of the tubes is empty, noticed by the operator on opening the cover A', then the operator opens the door $A^2$ and removes the corresponding filling-tube N, which latter is placed with its lower end into the corresponding tube B, and then the operator presses the outer or handle ends of the tongs P, so that the inner ends of the members P' open—that is, the lugs $P^2$ move away from under the first coin, so that the several coins pass out of the tube N into the tube B.

It will be seen that this change-maker is very simple and durable in construction and is easily manipulated for making the desired amount of change or for receiving change and separating the various coins according to their value in filling-tubes, which serve to refill the tubes of the change-maker.

If desired, the casing A is provided with a suitable cash-drawer for receiving bills or coins not used in the apparatus.

Having thus described our invention, we claim as new and desire to secure by Letters Patent—

1. A change-maker comprising a casing, a series of coin-holding tubes open at their upper ends and provided at their lower ends with mechanism for discharging the coins for change, and a series of open-ended removable receiving or filling tubes for receiving the coins and discharging them into the coin-holding tubes when placed thereover, and coin retaining and releasing devices on the lower ends of the receiving or filling tubes to hold the coins therein while the said tubes are being transferred to the change-holding tubes, substantially as set forth.

2. A change-maker comprising a casing having a series of openings varying in size, coin-filling tubes below the said openings, a series of coin-receiving tubes in the upper part of the casing, push bars or slides at the bottom of the tubes, a chute below the said tubes, a change-table below the chute, pivoted and spring-pressed bell-crank levers engaging the slides or push-bars, and sliding keys engaging the bell-crank levers, substantially as described.

3. A change-maker comprising a casing provided in its upper portion with a series of coin-holding tubes open at their upper ends and provided at their lower ends with a coin-discharging mechanism, a series of operating-keys forming part of said discharging mechanism, a change-table between the keys and the lower ends of said tubes to receive the coins therefrom, and a series of removable open-ended receiving or filling tubes in the casing below and in front of the said keys to receive the coins given in change and transfer them to the coin-holding tubes, and outwardly-movable devices entering the lower ends of the receiving or filling tubes to hold the coins and to release them and permit them to drop therefrom into the holding-tubes, substantially as set forth.

4. A change-maker provided with a filling-tube and a pair of tongs held on the said filling-tube and formed on its members with lugs projecting into the filling-tube to form supports for the coin, substantially as shown and described.

5. In a change-maker, the combination, with a series of tubes adapted to receive the various denominations of coins, of filling-tubes of various sizes to correspond with the said coin-receiving tubes and spring-pressed tongs held on the said filling-tubes and provided with lugs projecting into the filling-tube to form a support for the coin in said tube, substantially as shown and described.

6. In a change-maker, a filling-tube formed with a circular hollow offset, in combination with a pair of tongs arranged in said offset and provided with lugs projecting into the tube, substantially as herein shown and described.

GEORGE M. HILL.
FRED P. ALTER.

Witnesses:
  IRVING E. PHILLEO,
  ISAAC P. WITTER.